J. BUCHANAN.
PLOW.
APPLICATION FILED JULY 30, 1906
910,496.
Patented Jan. 26, 1909.
2 SHEETS—SHEET 1.
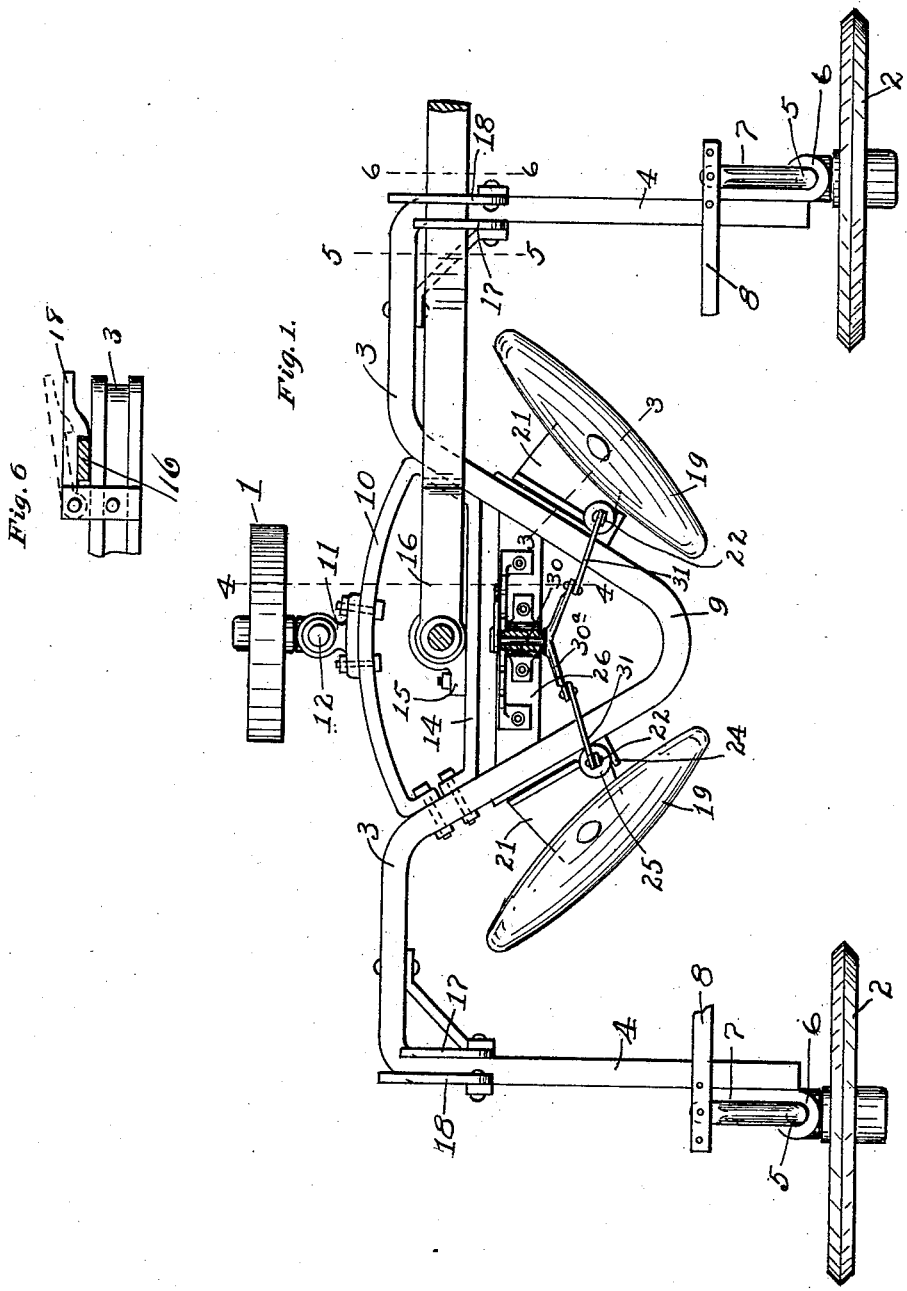
Witnesses,
William Whaley.
Carrie R. Ivy
Inventor,
Judson Buchanan
By Cyrus Kehr
Attorney.

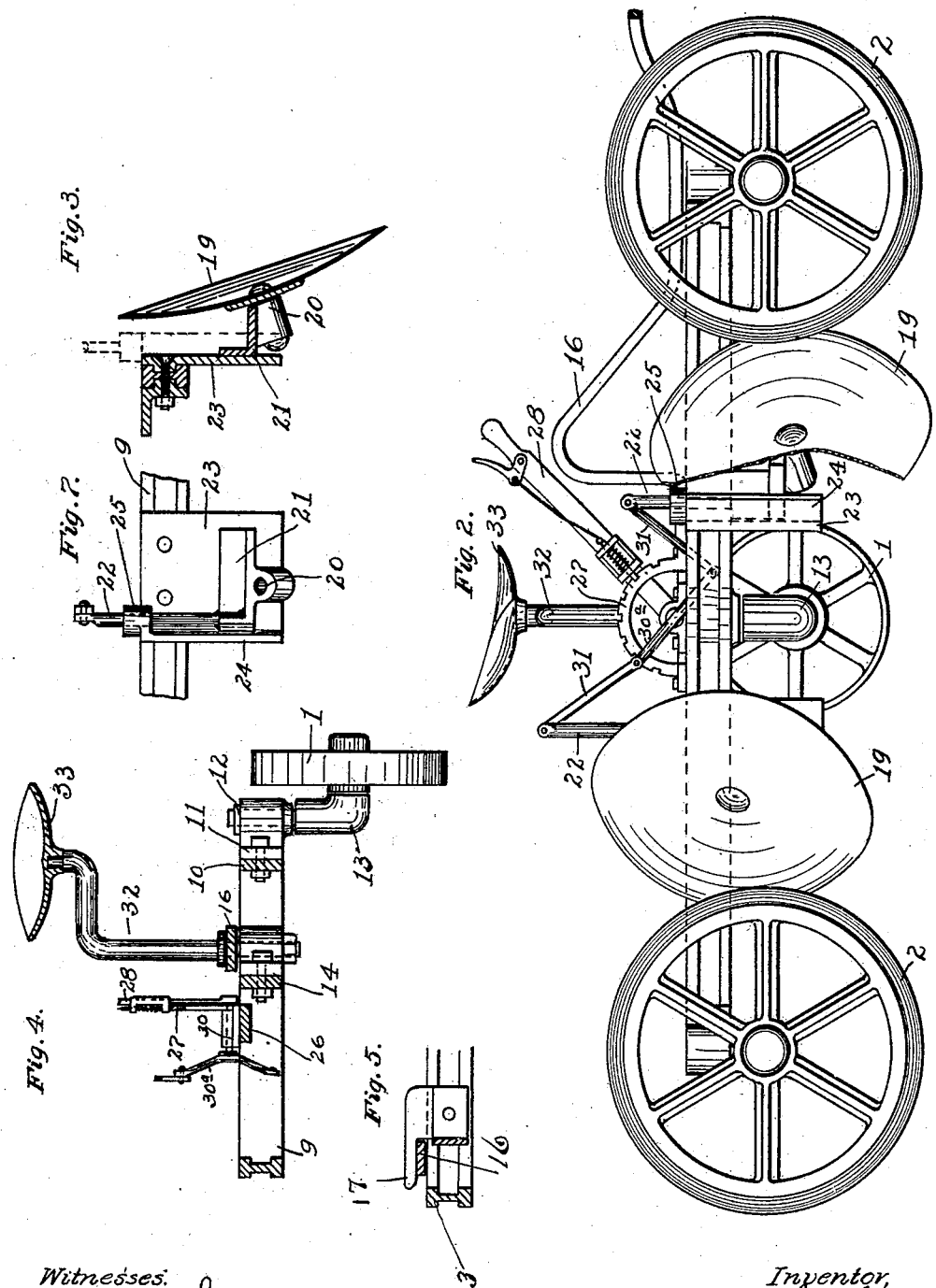

UNITED STATES PATENT OFFICE.

JUDSON BUCHANAN, OF CHATTANOOGA, TENNESSEE.

PLOW.

No. 910,496.  Specification of Letters Patent.  Patented Jan. 26, 1909.

Application filed July 30, 1906. Serial No. 328,392.

*To all whom it may concern:*

Be it known that I, JUDSON BUCHANAN, a citizen of the United States, residing at Chattanooga, in the county of Hamilton and State of Tennessee, have invented a new and useful Improvement in Plows, of which the following is a specification, reference being had to the accompanying drawing.

My improvement relates to plows having revolving mold-boards, and particularly to side-hill or reversible rotary mold-board plows. Heretofore such plows have been made reversible by means of mechanism for reversing the direction of the mold-board, the latter being partially rotated upon an approximately upright axis. In my improved plow, two rotary mold-boards are used, one facing in the proper direction to be operative when the plow is moved in one direction and the other standing in proper position for action when the plow moves in the opposite direction, and both said disks being in operative relation with a single raising and lowering mechanism, said relation being such as that when either of said disks is being lowered, the other will be raised. But my invention does not include the general construction of the device nor a separate raising and lowering mechanism for each disk but is limited to a single lifting device.

In the accompanying drawings, Figure 1 is a plan of the plow embodying my improvement; Fig. 2 is a side elevation; Fig. 3 is a detail section on the line 3—3 of Fig. 1; Fig. 4 is a section on the line 4—4 of Fig. 1; Fig. 5 is a section on the line 5—5 of Fig. 1, looking toward the right; Fig. 6 is a section on the line 6—6 of Fig. 1, looking toward the left; Fig. 7 is a detail view of a bearing plate and fixed plate by means of which the disks are secured to the plow frame.

Referring to said drawings, 1 is the land wheel and 2, 2 are the furrow wheels ordinarily used in such plows. Said wheels constitute the carrying wheels of the plow. The beam, 3, has its ends, 4, turned laterally, and the furrow wheels, 2, are secured to said ends by means of crank-form axles, 5, resting in upright bearings, 6, and having horizontal arms, 7, to the free ends of which are coupled horizontal links or bars, 8, which lead to controlling levers of ordinary form and which are not shown in the drawings, for the reason that they are well known in this art and do not relate to the present invention.

The middle of the beam, 3, is bent laterally to the same side as are the ends, 4, to form a V-shape portion, 9, and a bridge-form piece, 10, extends horizontally across the open side of said V-shape portion, and to the middle of said bridge-form piece is secured a block, 11, having an upright aperture receiving the upright arm, 12, of the angle-form axle piece, 13, to which said land wheel, 1, is applied. Said arm, 12, may be held non-rotatable in said block, 11, or it may be rotatable to a limited extent, if so desired, so that the plane of said land wheel will automatically assume a slight inclination to an upright plane which is parallel to the line of draft. But, as such adjustability of said wheel is known in the art and does not constitute a part of the present invention, I deem it unnecessary to describe such construction in detail. Within said V-shape portion, 9, is an inner bridge-piece, 14, which is parallel to the line of draft, and to the middle of said bridge-piece, 14, is secured a block, 15, to which is hinged the inner end of a tongue, 16. To each lateral portion of the beam, 4, is applied a stop, 17, and a latch, 18, which constitute locking mechanism by means of which the tongue may be secured in either of two positions parallel to the line of draft. When the tongue is secured in one of said positions by one of said locking devices, the plow is adapted to be drawn in the direction of the free end of said tongue, and when said tongue has been released and turned horizontally upon its pivot through half a circle and secured by the other of said locking devices, the plow is adapted to be drawn in the opposite direction.

Two revolving mold-boards or disks, 19, 19, are applied to the outer oblique faces of the V-shape portion, 9, of the beam in such manner as to permit bodily upward and downward movement. Each such disk is journaled in a bearing, 20, which bearing is supported by a plate, 21, and said plate is secured to an upright reciprocatory shaft, 22, at the upright edge of the said plate which is the nearer the furrow wheels. To the outer face of the V-shape portion of the beam is immovably affixed an upright plate, 23, having along its upright edge which is the nearer the furrow wheels a flange, 24, extending over the adjacent edge of the bearing plate, 21. Mounted upon the fixed plate, 23, is an upright bearing, 25, through which rises the shaft, 22. Within the V-shape portion of the beam is a third bridge-piece, 26, upon which is mounted a segmental rack, 27; and to such rack is applied a rack lever, 28. Adjacent to and concentric with such rack is a horizontal bearing, 29, in which rests a horizontal rock-shaft, 30. One end of said shaft is rigidly attached to the rack lever, 28. To the other end of said shaft is rigidly applied a cross-head, 30$^a$. To each end of said crosshead is coupled one end of a link, 31, and said link rises thence and has its other end loosely coupled to the upper end of one of the upright reciprocatory shafts, 22.

From the foregoing it will be understood that the shifting of the rack lever, 28, in either direction will effect the raising of one disk and at the same time the lowering of the other, and that by setting said rack lever in its middle position, both said disks may be held out of the ground when the plow is not in use.

When one of the disks is cutting, the ground presses it toward the adjacent portion of the beam and the adjacent fixed plate, 23, so that the bearing plate, 21, is pressed against said fixed plate. Thus said disk retains its proper position, notwithstanding the fact that its bearing plate is hinged on an upright axis by means of the shaft, 22, the link, 31, being coupled loosely so as to permit a limited rotation of said shaft. This construction leaves the disk free to "trail" when it is the rear disk and is by accident low enough to be engaged by the ground. A rigid seat-post, 32, supports a seat, 33. Said post rises from the block, 15, and is loosely surrounded by the tongue, 16, so that said post forms the journal for said tongue.

I claim as my invention:

1. In a rotary mold-board plow, the combination with carrying wheels and a frame adapted for two-way draft, of two disks in a line parallel to the draft line and directed oppositely and away from each other conformably to the opposite drafts and vertically adjustable, and a single raising and lowering mechanism for simultaneously raising either and lowering the other of said disks in upright lines, substantially as described.

2. In a rotary mold-board plow, the combination with carrying wheels and a frame adapted for two-way draft, and a reversible tongue, of two disks in a line parallel to the draft line and directed oppositely and away from each other conformably to the opposite drafts and adjustable in upright lines, and a single raising and lowering mechanism for simultaneously raising either and lowering the other of said disks, substantially as described.

3. In a rotary mold-board plow, the combination with carrying wheels and a frame adapted for two-way draft, of two disks in a line parallel to the draft line and directed oppositely and away from each other conformably to the opposite drafts and adjustable in upright lines, and a single rack-and-lever raising and lowering mechanism for simultaneously raising either and lowering the other of said disks, substantially as described.

4. In a rotary mold-board plow, the combination with carrying wheels and a frame adapted for two-way draft, of two disks in a line parallel to the draft line and directed oppositely and away from each other conformably to the opposite drafts, vertically adjustable members supporting said disks, and a single raising and lowering mechanism for raising either and at the same time lowering the other of said members, substantially as described.

5. In a rotary mold-board plow, the combination with carrying wheels and a frame, of two disks directed oppositely and away from each other in a line parallel to the line of draft, vertically adjustable and partially rotatable members supporting said disks, and a single raising and lowering mechanism in operative relation with both of said members for raising one and at the same time lowering the other, substantially as described.

6. In a rotary mold-board plow, the combination with carrying wheels and a beam having a middle V-shape portion, of two disks directed oppositely and vertically adjustable upon said V-shape portion, and a single raising and lowering mechanism in operative relation with both of said disks for simultaneously raising either and lowering the other, substantially as described.

7. In a rotary mold-board plow, the combination with carrying wheels and a frame, of two disks in a line parallel to the draft line directed oppositely and away from each other and vertically adjustable, a rock shaft, a cross-head applied to said rock shaft and having one end in operative relation with one of said disks and the other end with the other of said disks, a lever applied to said rock shaft, and means for securing said lever in different positions, substantially as described.

8. In a rotary mold-board plow, the combination with carrying wheels and a frame laterally extended at its middle and adapted for two-way draft, of two disks in a line parallel to the draft line and directed oppositely conformably to the opposite drafts and adjustable up and down, and a single raising and lowering mechanism for simultaneously raising either and lowering the other of said disks, substantially as described.

In testimony whereof I have signed my name, in presence of two witnesses, this twenty-seventh day of July, in the year one thousand nine hundred and six.

JUDSON BUCHANAN.

Witnesses:
O. F. JANES,
E. WATKINS.